Nov. 17, 1942.  G. H. DEIKE, JR  2,302,642
SAFETY BELT
Filed Oct. 23, 1940
Fig. 1.
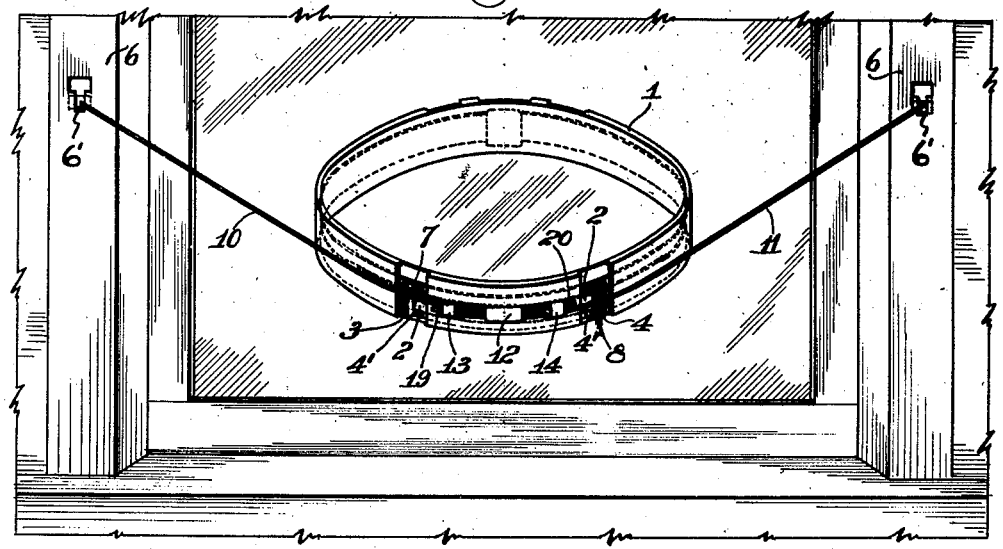
Fig. 3.
Fig. 2.
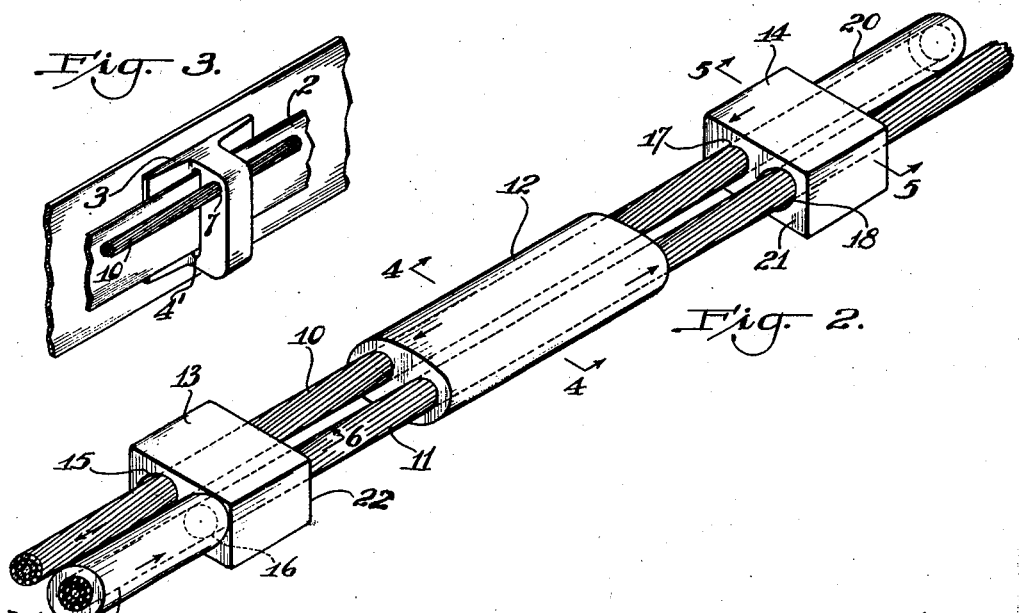
Fig. 4.   Fig. 5.   Fig. 6.
 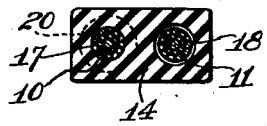 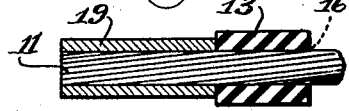
INVENTOR.
GEORGE H. DEIKE, JR.
BY Frank E. Foote
ATTORNEY.

Patented Nov. 17, 1942

2,302,642

UNITED STATES PATENT OFFICE 2,302,642

SAFETY BELT

George H. Deike, Jr., Wilkinsburg, Pa., assignor to Mine Safety Appliances Company, Pittsburgh, Pa.

Application October 23, 1940, Serial No. 362,435

7 Claims. (Cl. 227—49)

This invention relates to an improvement in a safety belt adaptable for use by construction workers, window cleaners and others employed in locations where protection against fall is needed, and more particularly, to an improvement in a shock absorber or means adaptable to being incorporated into the whole assembly and operative to damp the shock which may be applied to the belt when a load is suddenly applied as would be produced by a falling body.

It is among the objects of this invention to provide a shock absorber or shock cord adaptable to a body belt and which is effective in damping the shock that would be transferred to the body belt, as in the event of a fall whereupon the full weight of the body is suddenly applied to the belt, and which is inexpensive in manufacture, simple in operation, light in weight and readily adaptable. Other objects of this invention will become apparent from the following description of a preferred embodiment of my invention and which is illustrated in the drawing, in which:

Fig. 1 is an elevational view of the preferred embodiment of my shock absorbing means and illustrates its application to a type of body belt generally used for this purpose;

Fig. 2 is a perspective view of the same embodiment of my invention;

Fig. 3 is a fragmentary perspective view illustrating more in detail the means employed to support the shock absorbing means by a body belt;

Fig. 4 is a sectional view taken along the line 4—4 of Fig. 2;

Fig. 5 is a sectional view taken along the line 5—5 of Fig. 2; and

Fig. 6 is a sectional view taken along the line 6—6 of Fig. 2.

A safety belt of the type contemplated in this invention includes a body belt 1 which is placed around and engages the body of the wearer and may include some form of a cushion such as a layer of fabric or other material which renders some comfort in the wearing. To this body belt may be attached an outer belt 2 which holds the inner or body belt in position and it affords a means for attaching a strap or cord, the ends of which are to be attached to a fixed support 6 such as a window casement or other means available for providing ample support to the belt.

In my invention this outer belt 2 carries a support in the form of two metal T-blocks 3 and 4, each of which has an opening 4' through which the outer belt 2 passes. The T-block 3 is positioned on one side of the belt and the T- block 4 is positioned on the other side of the belt to properly provide support and in my invention each is to carry and in effect attach a cable to the body belt. Block 3 has an opening 7 and block 4 has an opening 8 through which a cable passes and to which a fixed support is to be attached. An attaching means 6', which has heretofore been employed in the art in connecting an end of a support strap to a window casement or other fixed support, can be used and a part of which is connected to an attachable end of each of the cables or cords which in turn is attachable to a complementary part of the means that is attached to a fixed support.

In this invention a pair of cables 10 and 11 are used and which are connected by means of a rubber matrix 12 or any other material having the necessary resilient properties comparable to rubber. Preferably these cables should be made of stranded spirally wound metal material to which rubber material can be readily molded and become somewhat securely fastened. It has been found that ordinary spiral cable is suitable for the purpose of this invention and by employing any of the ordinary processes for molding and setting of rubber or other plastic materials the rubber matrix formed becomes sufficiently adherent to the cables to provide the results desired by this invention. The length of the matrix 12 or snubber block will depend upon the purpose of the belt. That is, if it is desired to provide a belt in which the damping action will be abrupt or of short duration and be able to withstand suddenly applied large loads, it is necessary to extend or provide a matrix of some length, that is, a length of several inches, or provide material more rigid in character. On the other hand, if it is desired that the matrix be more yieldable and thus provide more gradual damping of the shock ordinarily transferred to the body belt, the matrix may be made shorter in length in comparison or supply such material that more yield is accomplished upon the application of a load. Fabric material can be applied to the outside surface of the matrix or block to reinforce it and prevent any damage during use. By thus securely fastening the matrix to the outer surfaces of the individual strands making up the cable, the matrix is able to withstand considerable force when oppositely directed forces are applied to the cables and it yields in the directions of the cables similar to the stretching of rubber material. By the application of continued force or force of greater amount, the cables will begin to sever from the matrix and allow the cables to continue movement in the direction of force applied to each. This gradual yielding of the rubber matrix or block to force applied is the means producing a damping action to the shock transferred to the belt by a sudden application of load. An advantage is that the means or medium employed is inexpensive and it can be made suitable for any purpose by providing a block of material that will give the results desired.

An additional safety device, which is an indispensable part of the invention, is incorporated into the assembly by means of check blocks or cable locks 13 and 14 positioned on each side of the matrix 12. These locks are made of a suitable material that possesses sufficient strength for their purpose, and for the purpose of illustration they are represented as being made of rubber material, although it may be advisable for greater safety to make the blocks of metal material or a reinforced rubber material. Cable lock 13 contains a pair of openings 15 and 16 which accommodate the cables 10 and 11 and likewise cable lock 14 contains openings 17 and 18. The cable 10 fits loosely in the opening 15 of the lock 13, while the cable 11 is made to fit rather tightly in its opening 16 as illustrated more specifically in Figs. 5 and 6. The cable 11 terminates beyond the outer face of the block 13 and extends only a sufficient distance to accommodate a sleeve 19 that is to be fastened or swaged to it for forming a suitable abutment to carry the lock 13 into engagement with a surface of the matrix 12. In block 14 the opening 17 is made so that the cable 10 fits somewhat tightly therein. The cable 10 extends beyond a sufficient distance only to accommodate a sleeve 20 which is fastened or swaged tightly thereto. The cable 11 fits rather loosely in the opening 18 of block 14 as is the case with cable 10 in fitting in the opening 15 of lock 13.

Should a load sufficient to break the cables from the matrix 12 occur, the locks 13 and 14 are then moved into engagement with the matrix 12 by continued movement of the cables in the direction of applied force. By this action, an additional damping action is provided in that the matrix is compressed to some extent and with the final result that a secure and more or less rigid connection of the belt to the fixed support is produced. By this action some of the shock that would ordinarily be transferred to the body belt is damped. The amount of space provided between the blocks and the engageable surface of the matrix is determined by the resiliency of the material of the matrix and the amount of relative movement of the cables before the matrix is severed from the cable surfaces. This feature of movement of the locks 13 and 14 into engagement with the matrix and subsequent compression of the matrix is advantageous both as a means for damping shock as well as providing evidence of the conditions of or intensity of the fall deducible from the relative position of the elements after a fall.

This assembly can be supported on to the outer belt 2 as illustrated in Figs. 1 and 3, but it is apparent that other means of support for the shock absorbing means can be provided and it is not intended that the invention be limited to this arrangement. I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. In a safety belt, a shock absorbing means comprising two support members, the members being joined by a resilient means attached to a portion of each of the members, an abutment means for each support member, and each abutment means being disposed relative to each other on opposite sides of the resilient means and spaced therefrom and operative to abut the resilient means by movement of its support relative to the resilient means to lock the assembly against further relative movement of the support members by compression of the resilient means.

2. In a safety belt, a shock absorbing means comprising two oppositely extending support members, the members being joined by a resilient means attached to a similar portion near the end of each of the members, a safety abutment means for each support member, and each abutment means being engageable with its respective support member and being disposed relative to each other on opposite sides of the resilient means and spaced equally a predetermined distance therefrom, the abutment means of each support being operative to move to a position abutting the surface of the resilient means by relative movement of the resilient means and the support members to lock the assembly against further relative movement by compression of the resilient means.

3. In a safety belt, a shock absorbing means comprising two longitudinally and oppositely extending support members having connectable ends, the members being connected intermediate their ends by a unitary resilient means molded to and fixedly attached to a portion of each of the members to yieldably oppose relative movement of each of the members, an abutment member for each support member and engaging its respective member substantially at its free end and operative to move to a position engaging a surface of the resilient means by relative movement of each support member to resist further relative movement.

4. In a safety belt, a yieldable means comprising two cable members oppositely extending relative to each other and one end of each of the members being connectable to a rigid support, the members being connected by a resilient matrix means enveloping and attached to a portion of each member near their free ends and of a length depending upon the yielding characteristics desired, a lock abutment member for each of the cable members and attached to its respective member substantially at the free end of the member and operative to engage the resilient means by a predetermined relative movement of the cable members to resist further relative movement of the member.

5. In a safety belt, a shock absorbing means comprising a pair of substantially unyielding cables in lateral spaced relation relative to each other, one end of each of the members to be connected to a rigid support and oppositely extending relative to each other, a yieldable matrix member integrally attached to and enveloping a portion of the surface of the cables and having a length extending in the longitudinal direction of the cables sufficient to provide an adequate yielding support, a safety abutment means for each cable positioned between the free end and the attachment to the matrix and in spaced relation to the resilient means and each having apertures through which the other cable passes to hold in spaced relation, and a means attached to the end portion of each cable to operatively connect the cable to its abutment means and to enable the means to be moved to engage the matrix member by relative movement of the cable members to resist further relative movement of the members.

6. In a safety belt, a shock absorbing means comprising a pair of substantially unyielding spirally wound stranded spaced cable members oppositely extending and one end adapted to engage a rigid support, a resilient matrix means molded to a portion of the surface of each of the cables intermediate the ends of each cable and near the end other than the engageable end and extending a sufficient amount to provide adequate yielding support to a load applied to the belt, a lock abutment member for each cable between the end other than the engageable end and the matrix and in spaced relation to the matrix and having an opening through which the other cable passes to hold the cables in spaced relation at this location and a means attached to the other end portion of each cable to abut a surface of the lock member opposite to the resilient means and operative to move the lock means into engagement with the resilient means by relative movement of the cable members and thereby restrict further relative movement of the cable members.

7. In a safety belt, a shock absorbing means comprising a pair of substantially unyielding cables having an engageable end oppositely disposed relative to each other and each cable being composed of spirally wound strands of metal material and each having a portion overlapping a portion of the other, a snubber block of resilient material molded to a portion of the surface of each of the members to laterally space one cable from the other and integrally and resiliently join each cable to the other and in spaced relation, the block extending along the length of the cables a sufficient distance to provide adequate yielding support and being positioned in the overlapping portion of each cable, a lock member for each cable and containing a pair of apertures through which the overlapping portion of cables pass and held in spaced relation, the cable for each lock member terminating a short distance beyond the outermost surface of the lock and in a direction opposite to the resilient means and extending sufficiently in the opposite direction to space the innermost surface of the lock member a predetermined distance from an engageable surface of the snubber block, and a means attached to the end portion of each cable to attach the lock member to the snubber block and operative to move the lock member in a direction toward the engageable surface of the snubber block by movement of the relative movement of the cable members whereby upon sufficient movement the innermost surface of the lock abuts the engaging surface of the snubber block and restrains further relative movement of the cables, GEORGE H. DEIKE, Jr,